(12) United States Patent
Lewis

(10) Patent No.: US 6,650,270 B1
(45) Date of Patent: Nov. 18, 2003

(54) RADAR SYSTEM

(75) Inventor: Bernard L. Lewis, Winter Park, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 03/755,362

(22) Filed: Aug. 15, 1958

(51) Int. Cl.7 .................................................. G01S 7/36
(52) U.S. Cl. .............................. 342/16; 342/17; 342/18; 342/19
(58) Field of Search .............................. 343/5, 7.4, 117, 343/16.1, 16.2, 17.1, 17.2, 17.5; 342/13, 16, 17, 18, 19, 67, 89, 90, 91, 93, 95, 97, 159, 162, 198

(56) References Cited

U.S. PATENT DOCUMENTS

| | | | | |
|---|---|---|---|---|
| 2,527,547 A | * | 10/1950 | Hardy | 342/19 |
| 2,676,317 A | * | 4/1954 | Purington | 342/129 |
| 2,682,656 A | * | 6/1954 | Phillips | 342/80 |
| 2,724,825 A | * | 11/1955 | Davenport | 342/77 |
| 2,745,099 A | * | 5/1956 | Bollinger et al. | 342/371 |
| 2,810,908 A | * | 10/1957 | Crawford et al. | 343/786 |
| 2,817,835 A | * | 12/1957 | Worthington, Jr. | 342/149 |
| 2,929,058 A | * | 3/1960 | Blasberg et al. | 342/79 |
| 3,879,730 A | * | 4/1975 | Arsem | 342/95 |
| 3,895,385 A | * | 7/1975 | Alpers | 342/421 |
| 3,986,187 A | * | 10/1976 | Jacob | 342/95 |
| 4,010,469 A | * | 3/1977 | Marcum | 342/16 |

* cited by examiner

Primary Examiner—John B. Sotomayor
(74) Attorney, Agent, or Firm—L. George Legg; John J. Karasek

(57) ABSTRACT

The present invention describes a system for counteracting countermeasures against radar detection. Two known countermeasures are "phase front tilting" and "isotropic scattering." The invention accomplishes this counteraction by deliberately producing a tilt in the phase front of the transmitted energy. This causes the phase front tilting countermeasure itself to become a tracking signal source for the radar system. The isotropic scatterer types of countermeasures are insensitive to the phase front of the transmitted energy and hence produce return signals which may be distinguished from a true radar echo return signal which is highly sensitive to the phase front of the transmitted energy. Thus this invention provides a radar system having a high degree of immunity to radar countermeasure devices.

4 Claims, 3 Drawing Sheets

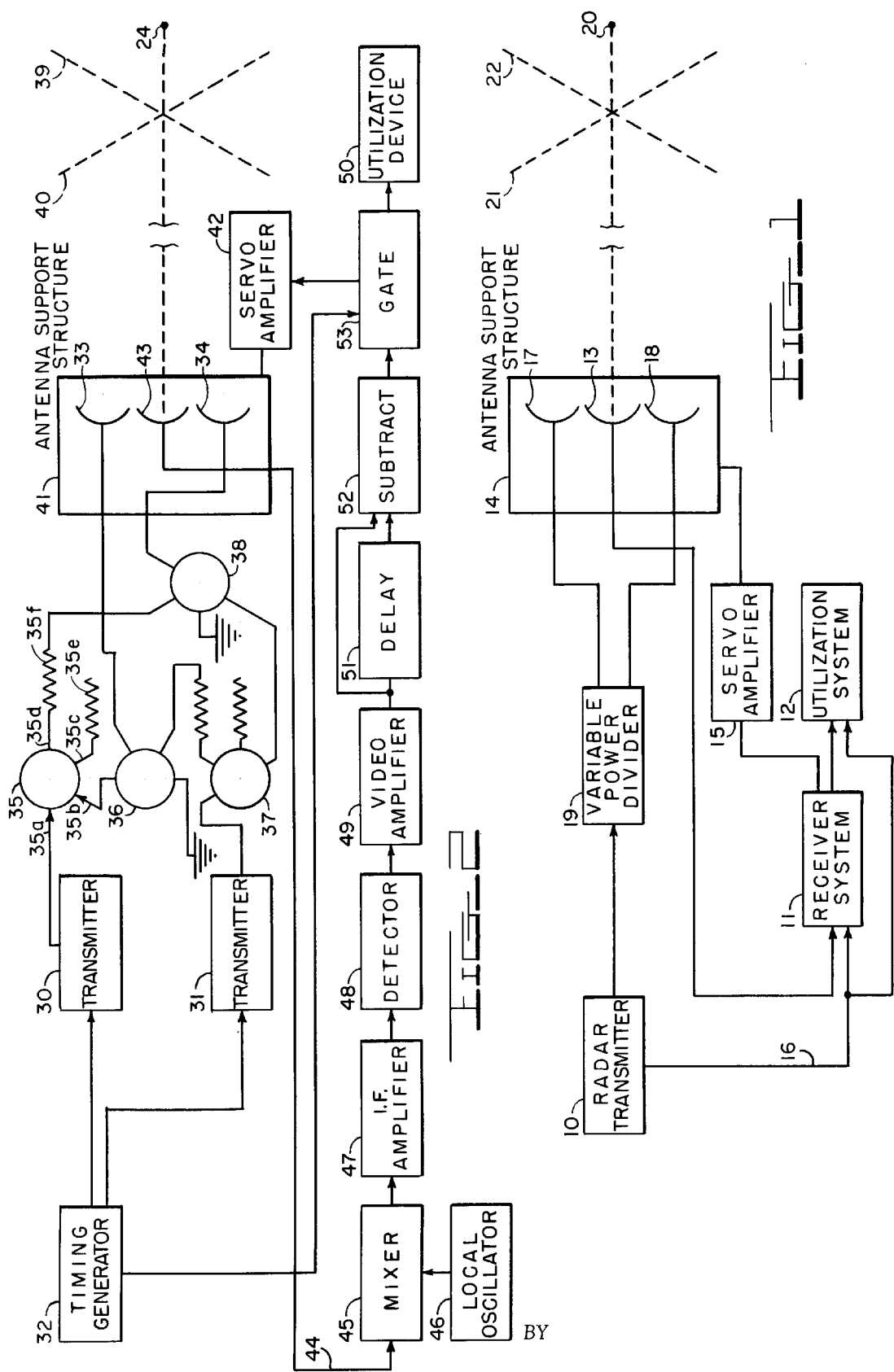

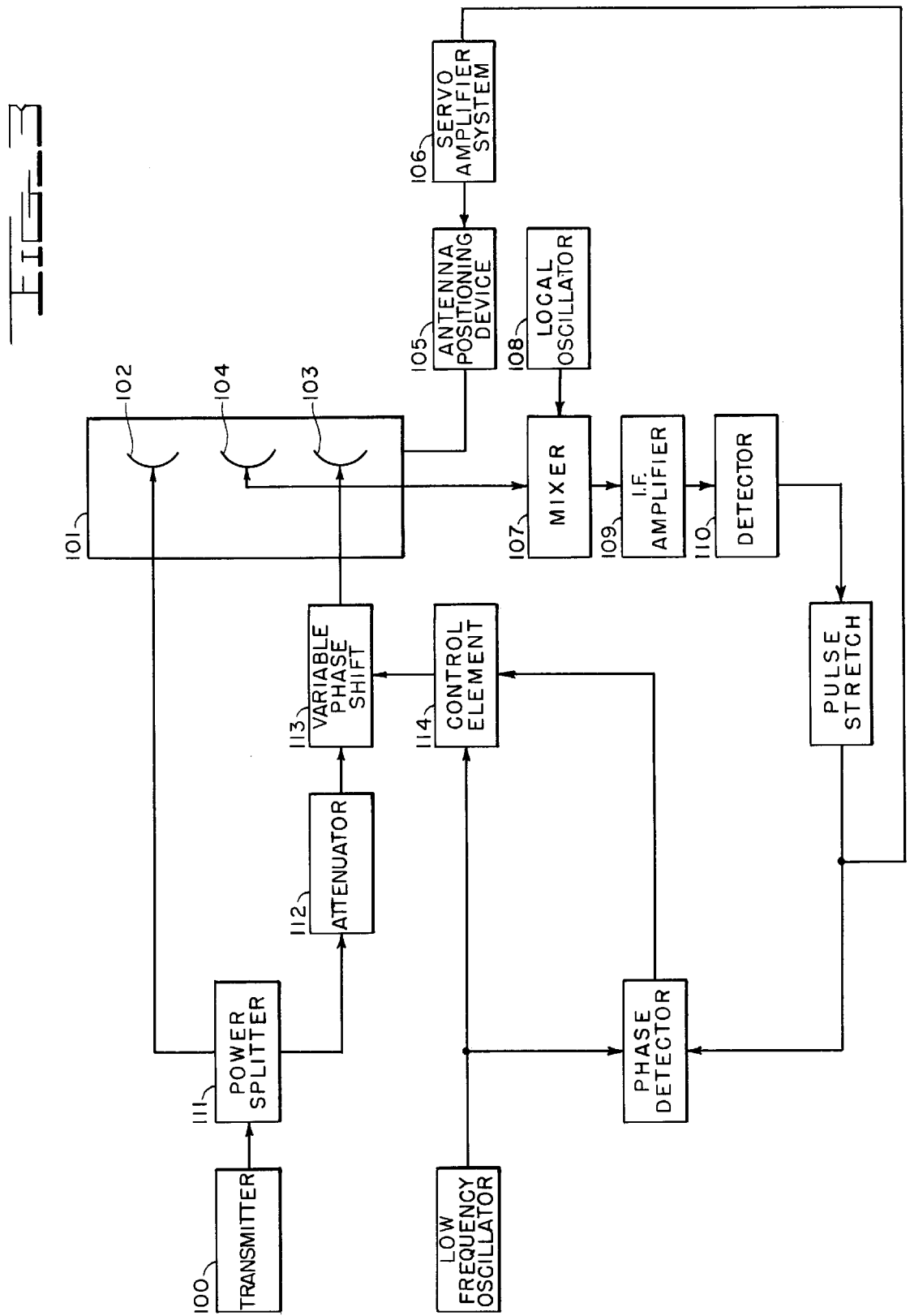

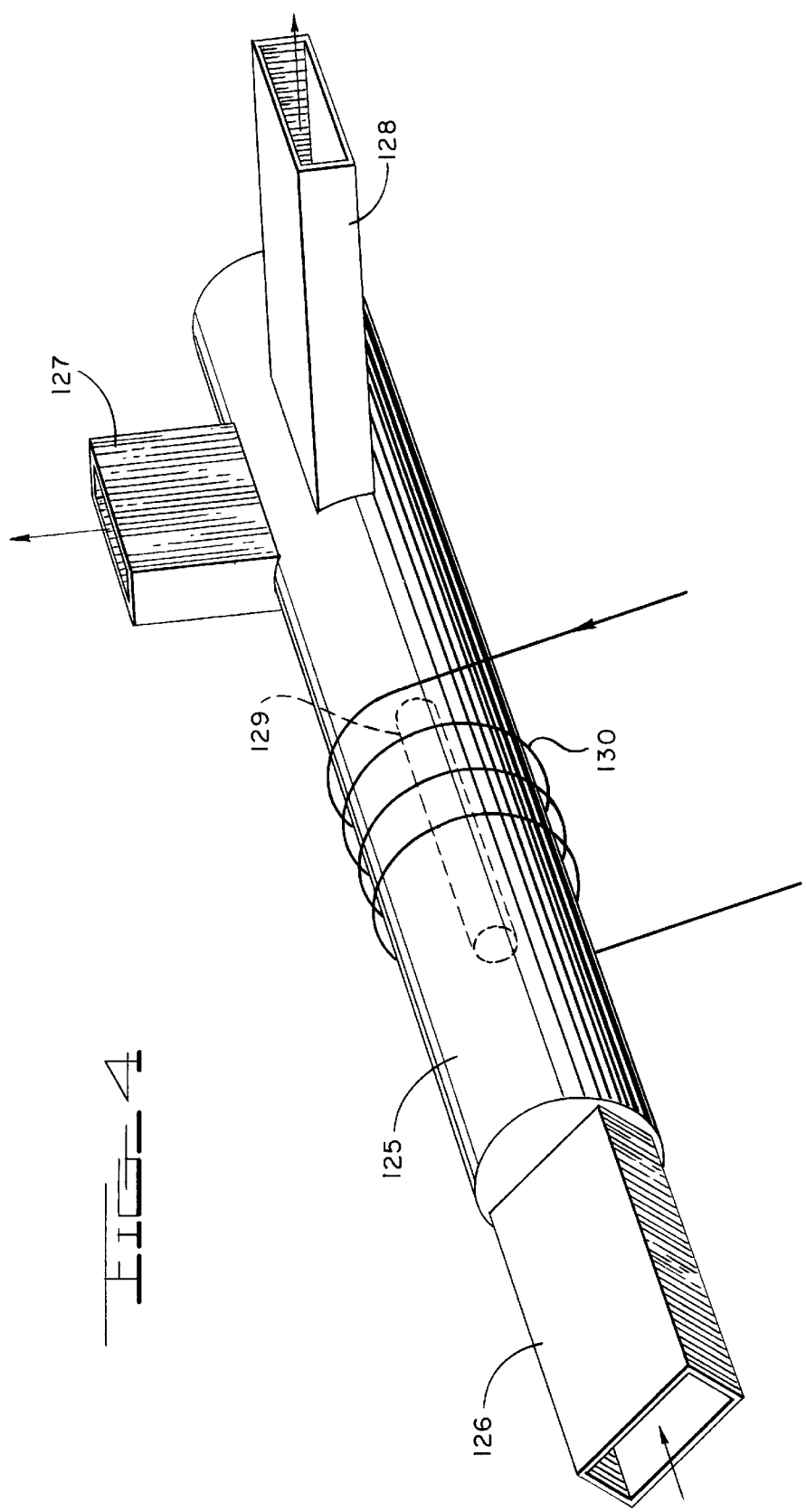

RADAR SYSTEM

BACKGROUND OF THE INVENTION

The invention described herein may be manufactured and used by or for the Government of the United States of America for governmental purposes without the payment of any royalties thereon or therefor.

This invention relates to object detection systems in general and in particular to radar systems having exceptionally high immunity to interference.

Since an essential part of modern warfare is the location of targets or reference marks by means of a detection system such as radar, it is appropriate to presume that any potential enemy will take steps, such as the creation of man-made interference by countermeasures device to prevent the effective use against himself of detection equipment. Such countermeasures devices may assume various forms such as an inverse gain repeater, a range gate pull-off repeater, chaff, radar decoys, image frequency jammers, and other forms, each of which assumes the nature of an isotropic scatterer because of the necessity in such a countermeasures device for wide angle coverage and broad frequency bandwidth. The usual form of target, such asian aircraft, is not an isotropic scatterer hence apparatus capable of differentiating between a signal obtained from a complex target and a signal obtained from an isotropic scatterer can permit the continuance of reliable detection and tracking for fire control and guidance purposes despite the presence of such countermeasures.

An additional type of countermeasures device described in copending application Ser. No. 755,361, filed coincidentally, entitled. "Security Device" "produces a tilt" of the front phase of the return signal from the target to confuse the usual radar system which determines the direction of a distant energy return object by sensing the phase front of return energy. The phase front "tilt" is produced by the emission of signals from the vicinity of an energy reflective object which corresponds in characteristics and timing to the normal radar echo signals produced by the energy reflective object but which are of greater amplitude and, which is very important, produce a composite phase front of return energy which is not perpendicular to the direct path between the energy reflective object and the receiver antenna, being "tilted" with respect to such direct path. The result when such a signal is received at the radar system is to cause the antenna of the radar system to orient itself in a direction such that its major axis of directivity is perpendicular to the phase front of energy as received but which no longer corresponds to the true direction to a distant energy reflective object. This causes complete loss of tracking accuracy.

The present invention seeks to counteract such a phase front tilting countermeasure as well as the isotropic scatterer form of countermeasure by deliberately producing a tilt in the phase front of the transmitted energy. This causes the phase front tilting countermeasure itself to become a tracking signal source for the radar system whereas the isotropic scatterer types of countermeasures are insensitive to the phase front of transmitted energy and hence produce return signals which may be distinguished from a true radar echo return signal which is highly sensitive to the phase front of transmitted energy.

BRIEF SUMMARY OF THE INVENTION

It is accordingly an object of the present invention to provide a radar system having a high degree of immunity to countermeasures devices.

Another object of the present invention is to provide a radar system which is immune to phase front tilt countermeasures devices.

Another object of the present invention is to provide a radar system having immunity to countermeasures devices and which has improved operational characteristics for conventional object location operations.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 1 is a block diagram of apparatus embodying teachings of the present invention.

FIG. 2 is an improved radar system having enhanced operational characteristics which manifest themselves in either the presence or absence of countermeasures operations.

FIG. 3 is an improved radar system providing automatic optimization of the phase front tilt of transmitted energy.

FIG. 4 shows details of a controllable power splitter for use in connection with the apparatus of FIG. 3.

DETAILED DESCRIPTION OF THE INVENTION

With reference now to FIG. 1 of the drawings, a simplified embodiment of features of the present invention is show including several typical components of a conventional tracking radar system. These conventional components include a transmitter 10, a receiver system 11, a utilization system 12, which may typically include cathode ray tube signal presentation devices, a receiver antenna system 13 mounted on a suitable support structure 14 which positions the antenna in desired directions, and a servo amplifier 15 which provides energization of the antenna support structure 14 for positioning the antenna system in dependency on received signal output from the receiver system 11. As is customary, the receiver system 11 and the utilization system 12 may receive timing signals from transmitter 10 through line 16 for synchronized operation of certain circuitry such as range gates, indicator sweeps, and the like.

The complete structure of FIG. 1 includes additional components comprising a plurality of transmitting antennas 17 and 18 together with a variable power divider 19 which provides control of the relative excitation of the transmitting antennas 17 and 18, which excitation varies at a selected rate. As a result of such variation the energy leaving the transmitting antennas and traveling to a distant energy reflective object located at point 20 will not have a wave front which is perpendicular to a line drawn between the antennas 17 and 18 and the point 20 but rather the wave front will be tilted with respect to the usual perpendicular along lines such as that shown by dotted lines 21 and 22. Line 21 indicates the wave front resulting from one condition of power division produced by variable power divider 19 whereas line 22 represents the wave front resulting from a second condition of the power division produced by variable power divider 19. Typically the variable power divider 19 will alternate from one to the other of two limiting conditions at a selected rate in accordance with considerations which will appear henceforth. As an example for the present, a switching rate of the order of 10 to 20 cycles per second may be considered typical.

The receiver system 11, the receiving antenna system 13, the servo amplifier 15, and the antenna supporting structure 14 are as previously indicated substantially conventional components of a tracking radar receiver system. Thus the antenna system 13 will normally be a relatively complex structure designed to produce reception from different directions or "lobes" slightly displaced about the major axis for signal comparison purposes. It may be one of many arrangements such as a conical scanning system, a simultaneous lobing system, or a sequential lobing system. Such a receiver system normally will be automatic to cause self orientation of the antenna to where the receiver antenna system is pointed in a direction perpendicular to the phase front of a received signal. Such a system is adversely affected by a countermeasures system which produces tilting of the wave front of return energy, the result being a failure of the system to indicate the true direction of the point 20. When such a system receives energy that has a phase front alternately corresponding to lines 21 and 22 provided such alternation is at a frequency which is not within the response band of the servo amplifier 15, it will provide an integration effect of the signals to indicate the true direction of the point 20. The receiver will reject received signals which occupy one phase front 21, or the other 22, identically, such signals being merely a form of "d.c. bias signal" which may be eliminated by suitable filtering circuitry.

The normal servo amplifier 15 contains bandwidth selective components which restrict its response to variational frequencies of selected values. Typically it would not respond to signals of frequency comparable to the scan rate of a conical scan receiver antenna system, nor to the pulse rate of the radar transmitter. In a typical instance where the radar transmitter operates at a pulse repetition frequency of 1,000 cycles per second, and the conical scan of antenna system 13 occurs at a rate of approximately 60 cycles per second, a servo bandwidth of approximately 5 cycles per second would be reasonable. Under such conditions the variable power divider would typically operate at a frequency of the order of 10 cycles per second.

With reference now to FIG. 2 of the drawings, the apparatus shown therein employs two radar pulse transmitters and a passive combining network feeding the transmitting antenna system in such manner that the pulses generated by one transmitter travel outward with a different phase front from those produced by the other transmitter. Such a system, although somewhat more complex than the circuit of FIG. 1, has several advantages in that there are no limitations imposed by a variable power divider so that bandpass characteristics of the antenna drive mechanism are normally not limiting factors.

The apparatus of FIG. 2 contains the transmitters 30 and 31 which are of conventional radar type designed to produce high power short duration pulses of radio frequency energy at a selected recurrence rate. Control of the pulse rate of the transmitters 30 and 31 is accomplished by means of a timing generator 32 which in this instance is shown separate from both transmitters 30 and 31 because of its operation to control the timing of the two transmitters. Typically, timing generator 32 will deliver a modulator or timing pulse to transmitter 30 which is of a recurrent nature as is conventional in radar operation. In addition, it will deliver a second series of timing pulses to transmitter 31 which are characterized by being individually delayed a selected interval of time relative to the individual pulses delivered to transmitter 30. The result of this timing of the transmitters 30, 31 is that the radio frequency pulse output of transmitter 31 will be delayed by a small interval of time relative to the pulse output of transmitter 30. Both transmitters 30 and 31 are connected to transmitting antennas 33 and 34 by means of a power control system containing the hybrid junctions 35, 36, 37 and 38. These hybrid junctions operate to deliver power from each transmitter to both transmitting antennas 33 and 34 in a selected relationship, typically of amplitude, wherein antenna 33 receives a greater proportion of the energy output of transmitter 30 than does antenna 34 and antenna 34 receives a greater proportion of the output energy of transmitter 31 than does antenna 33. As a result of the control of the relative excitation of the antennas 33 and 34, the composite of the energy leaving the antenna system will typically be with a phase front indicated by line 39 for the energy produced by transmitter 30 whereas the phase front of the energy produced by transmitter 31 would appear along the line 40.

The hybrid junctions 35–38 belong to a class of passive electrical devices which can be used to add two radio frequency signals, subtract them, or split the power of one signal. Broadly described such a device operates by splitting a signal into two parts in two paths and recombines the two parts with different relative path lengths so that the two parts either add or subtract at selected points. Typically the hybrid 35 is a waveguide ring having four ports coupling thereto. The total effective path circumference of the ring is one and one-half wavelengths, with the four ports spaced one-quarter wavelength apart in one direction, leaving three-quarter spacing between two of the ports. With such a device, energy applied to any one port will couple out of each adjacent port. Thus energy applied to port 35-$a$ from transmitter 30 is coupled out in substantially equal portions from ports 35-$b$ and 35-$d$. Actually no energy is coupled out of port 35-$c$ however a matched load 35-$e$ is connected thereto to provide absorption in case of minor impedance mismatches. Thus half of the energy from transmitter 30 is delivered from port 35-$d$ through a partial absorber 35-$f$ to portb of hybrid junction 38. Half of the energy delivered to junction 38 is coupled through port 38-$a$ to antenna 34. The remaining energy delivered to junction 38 is absorbed in arm 38-$c$ by an absorption load symbolically illustrated as a ground connection. The other half of the energy supplied by transmitter 30 to junction 35 is delivered by arm 35-$b$ to junction 36 which is in turn coupled to energize antenna 33. The transmitter 30 therefore will, because of absorber 35-$f$, energize antenna 33 more strongly than antenna 34, thereby producing the tilted phase front indicated by line 39. In a completely analogous manner the transmitter 31 energizes antenna 34 more strongly than antenna 33, thereby producing the tilted phase front indicated by line 40.

While the tilted phase fronts 39 and 40 have been described as arising from a difference in the amplitude of the energization of antennas 39 and 40, it will be apparent that a similar result could be obtained by utilizing the junction 35–38 to vary the phase of the energization of the antennas, Although the functional operation of junctions 35–38 is conventional and well known, a more detailed description of the operation of such junctions may be found in the Proceedings of the IRE for August 1946, Volume 34, No. 8, page 551 in an article entitled "Radar" by Edwin G. Schneider.

In the foregoing manner it is seen therefore that alternate emission of pulse type radio frequency energy in two different phase fronts is obtained as was accomplished with the apparatus of FIG. 1. A significant difference exists however in that with the apparatus of FIG. 2 a period of operation with each of the two phase fronts is obtained at the normal pulse repetition frequency of each transmitter as determined by timing generator 32 whereas with the apparatus of FIG. 1, several pulses of energy would be transmitted in sequence at each phase front.

The transmitting antennas 33 and 34 of FIG. 2 are mounted on a suitable antenna support structure 41 which includes provision for orienting the axis of directivity of the antennas in desired directions, typically elevation and azimuth. This orientation is produced by suitable drive mechanism contained within the antenna support structure 41 which is energized in conventional manner by drive signals from the servo amplifier 42.

The antenna support structure 41 also contains a receiver antenna system indicated generally by the numeral 43 which, as with the apparatus of FIG. 1, may be of conventional tracking radar design being typically of a conical scan arrangement in this instance with the received signal output being delivered through line 44 to a substantially conventional receiver system line-up including mixer 45, local oscillator 46, intermediate frequency amplifier 47, detector 48, video frequency amplifier 49 and utilization device 50, the latter being typically a cathode ray tube signal presentation device. The receiver apparatus of FIG. 2 does include several additional components identified as a delay device 51, a subtracting circuit 52, a gate 53, which operate to integrate the received signals resultant to the transmitter signals of the two different wave fronts and to compare them in such a manner as to obtain cancellation of any signals received which have additional phase front tilts as would be produced by the isotropic scatterer form of countermeasures device. The delay device 51 can typically be an artificial transmission line or delay line, the purpose of which is to delay the received energy obtained resultant to the first pulse of each pair as produced by transmitter 30 to where it exists in time coincidence with the received signal resulting from the second pulse of each pair as produced by transmitter 31. In the so-called mono-pulse radar system, signal subtraction occurs at R. F. or I. F. by the use of a high accuracy delay line. The delayed first pulse then exists in time coincidence with the undelayed second pulse in the output of the video amplifier 49 and the two are applied to a subtractor circuit the purpose of which is to provide an output signal which is dependent upon the difference of the two signals. For a countermeasure signal received in substantially uniform phase front for both pulse signals 30 and 31, which would correspond to an isotropic scatterer, the subtractor 52 will provide substantial cancellation. For received signals of a truly echo character as returned by the reflective surfaces unavoidably constituting a distant energy reflective object such as an airplane, the received signals resultant from one phase front 39 will combine vectorially with the countermeasure signal to produce a different composite than that resulting from the other phase front 40 so that a difference in amplitude normally will be experienced in the output of the video amplifier 49 for the two phase fronts 39 and 40 if the axis 24 of the receiver antenna 43 is not oriented in the true direction of the target. Thus when the output of video amplifier 49 as obtained in response to an energy reflective object is subtracted in the subtraction circuit 52 the difference signal will indicate the portion of the composite received signal which is a result of the echo object itself and the countermeasures signal will be eliminated.

The gating circuit 53 connected to the output of the timing generator 32 is inserted so that operation of the antenna support structure 41 will be limited to follow-up action upon a signal occurring at a selected range. Such in effect produces a range gate which is substantially conventional in tracking radar systems.

The operation of the radar system illustrated in FIG. 2 can be briefly summarized by stating that the isotropic scattering countermeasure device, being insensitive to the tilt of the illuminating phase fronts 39 and 40, will produce similar reflections for the phase fronts 39 and 40. These signals, originating from the countermeasure device, will be self-cancelling in the subtracting device 52 at all times, that is, without regard to whether or not the target is on the axis 24. In contrast, the reflection signals from the actual target will be sensitive to the tilt of the phase fronts 39 and 40. If phase fronts 39 and 40 are of equal amplitude, the reflections thereof from the actual target will be self cancelling in subtracting device 52 only if the target is on axis 24. In other words, the output of subtracting device 52 will not contain any confusing countermeasure signal but will relate solely to the position of the target relative to axis 24. The signal from subtracting device 52 therefore can be used in conventional manner by the servo system 42 to correctly position antenna structure 41.

The tilt of the wave fronts of the transmitter signals of the devices of FIGS. 1 and 2 with dissimilarity of phasing or amplitude of the signals in two antennas produces operation somewhat of the nature of a lobe switching action. The two transmitting antennas are directive in nature with the major directivity of each normally corresponding to the direction of the distant energy reflective object. The result is a reduction of illumination efficiency in the antenna system, which reduction normally is greater for greater angles of tilt. Since this loss of efficiency reduces the echo signal amplitude it is obviously desirable that the tilt be no greater than that required to provide elimination of the countermeasures signal. Since various countermeasures signals may require various amounts of "tilt" angle, it is desirable that the radar system have automatic tilt control apparatus for determining continuously the amount of tilt required for substantially eliminating the interference and automatically adjusting the tilt angle so as to maintain only that amount of tilt. The apparatus of FIG. 3 indicates an embodiment of the invention which incorporates such tilt sensing and adjusting circuitry.

One feature of the phase front tilting technique of the present invention is control of the effective reflection pattern of the target so that upon reception the radar receiver "sees" various portions of a "main lobe" of the pattern. The principles of FIG. 3 are employed for automatic rotation of the reflection pattern of the target to the nearest pattern peak for maximum return. To accomplish this a low frequency oscillator controls the power division on transmission and hence the tilt of the transmission phase front to thereby change the effective reflection pattern of the target, effectively rotating a major lobe of the target reflection pattern over a small angle. This causes the return signal to vary in amplitude reaching a peak for the proper orientation of the effective reflection pattern. A phase detector is employed to provide information relative to the sense of transmission phase front tilt producing maximum signal so that the oscillator may be automatically adjusted to provide the phase front angularity, which results in the maximum received signal.

The apparatus of FIG. 3 is similar in general layout to that previously described employing a single pulse type radar transmitter 100, a multiple antenna system 101 having transmitting antennas 102 and 103 and receiver antenna 104, antenna positioning device 105 and servo amplfier system 106. The antenna 104 is connected to a convention receiver wherein mixer 107, I.F. amplifier 109 and detector 110 are included. The basic system thus described, with exception of the dual transmitter system, is typically a conical scan radar system wherein the antenna 104 is rotated to sample a conical section of space, with automatic positioning of the antenna occurring to maintain the axis of the cone oriented in the direction of a distant energy reflective objects.

Transmitter energy is split into two parts by power splitter 117 part going directly to antenna 102, the rest going through attenuator 112 and variable phase shift device 113 to antenna 103. Phase shift device 113 is operated by a suitable control device 114 to produce by electrical or mechanical means a variation in the phase shift produced thereby. The result of such variation is alteration in the angle of tilt of the phase front of outgoing energy.

As shown in FIG. 4 the closed-end circular waveguide is indicated by numeral 125 having input port 126 which is a section of rectangular waveguide. The output ports, also rectangular waveguides, are indicated by numerals 127,128 which are at right angles to each other and in 45° polarization relationship to port 126. A section of ferrite rod is indicated by numeral 129 with a solenoid coil 130 for producing a magnetic field. With such a device for variable phase shift 113, the device 114 of FIG. 3 would include means for varying both the magnitude and the sense of a current supplied to coil 130 of FIG. 4.

The operation of device 125 is based upon the excitation of a simple mode in a circular waveguide having two output coupling ports disposed at right angles relative to each other to accept angularly related components of the E-field existing in the waveguide. If the E-field is set up at 45° relative to the output ports, the power will split equally between the two output couplers. Rotation of the E-field at the region of the output coupling ports will cause variation in the power splitting ratio. Such rotation can be provided by a ferrite element disposed within the waveguide in such position as to be acted upon by a controllable magnetic field. Thus by variation of the intensity of the field it is possible to vaxy the amount as well as the sense of the rotation of the E-field within the waveguide.

Obviously many modifications and variations of the present invention are possible in the light of the above teachings. It is therefore to be understood that within the scope of the appended claims the invention may be practiced otherwise than as specifically described.

What is claimed is:

1. An object locator system comprising transmitter means for producing carrier wave pulse energy, antenna means connected to said transmitter means for emitting trransmitter energy in alternate overlapping patterns having different phase fronts, a direction sensitive tracking receiver system, said tracking receiver system including signal averaging means for providing an output signal in dependency on the relative response of the receiver system to echo signals from distant objects for the emitted signals in the alternate phase fronts of transmitted energy.

2. An object locator system ccmprising transmitter means for producing carrier wave pulse energy, a plurality of transmitting antennas having overlapping radiation patterns, an antenna excitation control connected between said transmitter and said antennas for alternating the relationship of energy delivered to the antennas whereby the combined patterns of the plurality of transmitting antennas have two alternate phase fronts and substantially identical pattern coverage for both phase fronts, a direction sensitive tracking receiver system, said tracking receiver system including signal averaging means for providing an output signal in dependency on the relative response of the receiver system to echo signals from distant objects for the emitted signals in the alternate phase fronts of transmitted energy.

3. An object locator system comprising transmitter means for producing carrier wave pulse energy, a plurality of directive transmitter antennas each having a major axis of directivity, a support structure mounting said antennas with substantially parallel relationship of the major axis of directivity of the antennas, an antenna excitation control connected between said transmitter and said antennas for alternating the relationship of energy delivered to the antennas whereby the combined patterns of the plurality of transmitting antennas have two alternate phase fronts and substantially identical pattern coverage for both phase fronts, a direction sensitive tracking receiver system, said tracking receiver system including signal averaging means for providing an output signal in dependency on the relative response of the receiver system to echo signals from distant objects for the emitted signals in the alternate phase fronts of transmitted energy.

4. An object locator system comprising, transmitter means for producing carrier wave pulse energy, antenna means connected to said transmitter means for emitting transmitter energy in a selected pattern having alternating phase fronts of the energy contained therein, and a direction sensitive tracking receiving system, said tracking receiver system including signal averaging means for providing an output signal in dependency on the relative response of the receiver system to echo signals from distant objects for theemitted signals in the alternate phase fronts of transmitted energy.

\* \* \* \* \*